United States Patent [19]

Singer et al.

[11] Patent Number: 4,703,101

[45] Date of Patent: Oct. 27, 1987

[54] LIQUID CROSSLINKABLE COMPOSITIONS USING POLYEPOXIDES AND POLYACIDS

[75] Inventors: Debra L. Singer, Pittsburgh; Rostyslaw Dowbenko, Gibsonia; Dennis A. Simpson, Koppel, all of Pa.

[73] Assignee: PPG Industries, Inc., Pittsburgh, Pa.

[21] Appl. No.: 767,019

[22] Filed: Aug. 19, 1985

[51] Int. Cl.$^4$ ............................................. C08G 63/42
[52] U.S. Cl. ..................................... 528/87; 528/297; 528/176; 525/438; 525/440; 525/443; 525/327.3
[58] Field of Search ................ 528/87, 297, 176; 525/438, 440, 443, 327.3

[56] References Cited

U.S. PATENT DOCUMENTS

| | | | |
|---|---|---|---|
| 2,683,131 | 7/1954 | Cass | 525/533 |
| 2,712,535 | 7/1955 | Fisch | 525/533 |
| 2,857,354 | 10/1958 | Fang | 112/9 |
| 2,890,194 | 6/1959 | Phillips et al. | 525/438 |
| 2,890,210 | 6/1959 | Phillips et al. | 528/361 |
| 3,008,914 | 11/1961 | Fry | 523/456 |
| 3,179,714 | 4/1965 | Brockman et al. | 525/531 |
| 3,215,756 | 11/1965 | Lombardi et al. | 427/386 |
| 3,218,274 | 11/1965 | Boller et al. | 528/297 |
| 3,269,975 | 8/1966 | Lee | 523/400 |
| 3,408,215 | 10/1968 | Wismer et al. | 106/252 |
| 3,523,143 | 8/1970 | Kwong | 252/532 |
| 3,528,935 | 9/1970 | Marion et al. | 523/434 |
| 3,758,635 | 9/1973 | Labana et al. | 525/208 |
| 3,781,380 | 12/1973 | Labana et al. | 525/208 |
| 3,787,521 | 1/1974 | Labana et al. | 525/284 |
| 3,925,507 | 12/1975 | Katsimbas | 525/208 |
| 3,932,367 | 1/1976 | Labana et al. | 525/327.3 |
| 3,953,644 | 4/1976 | Camelon et al. | 428/220 |
| 3,954,712 | 5/1976 | Lottanti et al. | 528/115 |
| 3,975,314 | 8/1976 | Smyk et al. | 525/117 |
| 4,046,727 | 9/1977 | Itoh et al. | 523/220 |
| 4,102,942 | 7/1978 | Smith et al. | 528/365 |
| 4,226,755 | 10/1980 | Knecht | 528/348 |
| 4,291,137 | 9/1981 | Nakate et al. | 525/162 |
| 4,346,144 | 8/1982 | Craven | 428/335 |
| 4,350,790 | 9/1982 | Chattha | 525/110 |
| 4,359,554 | 11/1982 | Labana et al. | 525/386 |
| 4,403,093 | 9/1983 | Hartman et al. | 528/297 |
| 4,418,182 | 11/1983 | Chattha | 525/438 |
| 4,465,815 | 8/1984 | Chattha | 525/443 |
| 4,471,025 | 9/1984 | Bernelin et al. | 428/413 |
| 4,548,963 | 10/1985 | Cluff et al. | 523/427 |

OTHER PUBLICATIONS

Handbook of Epoxy Resins, by Lee and Neville, McGraw-Hill Book Co., 1967 Chapter 11.

*Primary Examiner*—John Kight
*Assistant Examiner*—M. L. Moore
*Attorney, Agent, or Firm*—William J. Uhl

[57] ABSTRACT

A crosslinkable composition comprising a polyepoxide and a polyacid which is the half-ester formed from reacting an acid anhydride with a polyol is disclosed. The compositions are useful as coatings, particularly as clear coats in color-plus-clear coatings.

11 Claims, No Drawings

LIQUID CROSSLINKABLE COMPOSITIONS USING POLYEPOXIDES AND POLYACIDS

BACKGROUND OF THE INVENTION

1. Field of the Invention

The present invention is in the field of crosslinkable compositions and more particularly to crosslinkable coating compositions which are useful in color-plus-clear coating applications.

2. Brief Description of the Prior Art

Color-plus-clear coating systems involving the application of a colored or pigmented base coat to a substrate followed by the application of a transparent or clear top coat to the base coat are becoming increasingly popular as original finishes for automobiles. The color-plus-clear systems have outstanding gloss and distinctness of image, and the clear coat is particularly important for these properties. Two-pack clear coat compositions comprising polyols such as polyester polyols, polyurethane polyols and acrylic polyols and polyisocyanate curing agents give outstanding gloss and distinctness of image. However, the polyisocyanates are difficult to handle being sensitive to moisture and require cumbersome safety precautions.

It is an object of the present invention to provide for a novel crosslinkable composition which avoids the problems of polyisocyanate curing agents and which provides for coatings which can be used in a wide variety of coatings applications. It is a further object of the present invention to provide a crosslinkable coating composition which can be formulated to a high solids coating composition with excellent adhesion, gloss and distinctness of image enabling the coating composition to be used as clear coats in a color-plus-clear coating system, particularly for use as an original finish for automobiles.

SUMMARY OF THE INVENTION

In accordance with the present invention, a crosslinkable composition comprising a polyepoxide and a polyacid curing agent which is a half-ester formed from reacting an acid anhydride with a polyol is provided. The curing agent can be tailor made with specific anhydrides and polyols without forming high molecular weight materials enabling the formulation of high solids coating compositions which provide cured coatings with excellent adhesion, gloss and distinctness of image. The compositions can be used in the formulation of clear coats for color-plus-clear coatings applications such as for automobiles.

DETAILED DESCRIPTION

The principal ingredients in the crosslinkable compositions of the present invention are the polyepoxide and the acid-containing half-ester.

Among the polyepoxides which can be used are epoxy-containing acrylic polymers which are preferred, epoxy condensation polymers such as polyglycidyl ethers of alcohols and phenols and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 carbon atoms in the alkyl group. Specific examples include methyl methacrylate, ethyl methacrylate, butyl methacrylate, ethyl acrylate, butyl acrylate and 2-ethylhexyl acrylate.

Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Acid group-containing copolymerizable ethylenically unsaturated monomers such as acrylic acid and methacrylic acid are preferably not used because of the possible reactivity of the epoxy and acid groups.

The epoxy group-containing ethylenically unsaturated monomer is preferably used in amounts of about 5 to 60, more preferably from 20 to 50 percent by weight of the total monomers used in preparing the epoxy-containing acrylic polymer. Of the remaining polymerizable ethylenically unsaturated monomers, preferably from 40 to 95, more preferably from 50 to 80 percent by weight of the total monomers are alkyl esters of acrylic and methacrylic acid.

In preparing the epoxy-containing acrylic polymer, the epoxide functional monomers and other ethylenically unsaturated monomers can be mixed and reacted by conventional free radical initiated organic solution polymerization techniques. These techniques involve polymerization in the presence of a suitable catalyst such as organic peroxides or azo compounds, for example, benzoyl peroxide or N,N'-azobis(isobutyronitrile). The polymerization is carried out in organic solution in which the monomers are soluble. Suitable solvents are aromatic solvents such as xylene and toluene and ketones such as methyl amyl ketone. Alternatively, the acrylic polymer may be prepared by aqueous emulsion or dispersion polymerization techniques, although this method is not preferred.

The epoxy-containing acrylic polymer typically has a number average molecular weight between about 1000 and 20,000, preferably 1000 to 10,000, and more preferably 1000 to 5000. The molecular weight is determined by gel permeation chromatography using a polystyrene standard. In determining molecular weights in this fashion, it is not the actual molecular weights which are measured but an indication of the molecular weight as compared to polystyrene. The values which are obtained are commonly referred to as polystyrene numbers. However, for the purposes of this invention, they are referred to as molecular weights.

The epoxy condensation polymers which are used are polyepoxides, that is, those having 1,2-epoxy equivalency greater than 1, preferably greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 1,1-bis(4-hydroxyphenyl)ethane, 2,2-bis(4-hydroxyphenyl)propane (bisphenol A) and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can also be used. Examples of these materials are described in U.S. Pat. No. 4,102,942 in column 3, lines 1-16. Specific examples of such low molecular weight polyepoxides are 3,4-epoxycyclohexylmethyl 3,4-epoxycyclohexanecarboxylate and bis(3,4-epoxy-6-methylcyclohexylmethyl) adipate. These materials are aliphatic polyepoxides as are the epoxy-containing acrylic polymers. As mentioned above, the epoxy-containing acrylic polymers are preferred because they result in products which have the best combination of coating properties, i.e., smoothness, gloss, durability and solvent resistance. Such polymers have been found to be particularly good in the formulation of clear coats for color-plus-clear applications.

The polyepoxide is present in the liquid crosslinkable composition in amounts of about 10 to 90 and preferably 25 to 75 percent by weight based on total weight of resin solids.

The polyacid which is in the crosslinkable composition contains two or more acid groups per molecule which are reactive with the epoxies in the polyepoxide to form a crosslinked composition as indicated by its resistance to organic solvent. The polyacid which is used is a half-ester formed from reacting an acid anhydride with a polyol. The acid functionality is preferably a carboxylic acid, although acids such as sulfonic acid may be used, but their use is not preferred. The half-esters are relatively low in molecular weight and quite reactive with epoxies enabling the formulation of high solids, fluid compositions while maintaining outstanding properties such as adhesion, gloss and distinctness of image.

The half-ester is obtained by reaction between a polyol and a 1,2-acid anhydride under conditions sufficient to ring open the anhydride forming the half-ester with substantially no polyesterification occurring. Such reaction products are of relatively low molecular weight, with a narrow weight distribution, and provide lower volatile organic contents in the coating composition while still providing for excellent properties in the resultant coating. By substantially no polyesterification occurring means that the carboxyl groups of the anhydride are not esterified by the polyol in a recurring manner. By this is meant that less than 10, preferably less than 5 percent by weight polyester is formed.

Two reactions may occur combining the anhydride and polyol together under suitable reaction conditions. The desired reaction mode involves ring opening the anhydride ring with hydroxyl, i.e.,

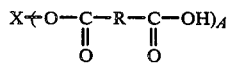

where X is the residue of the polyol after reaction with the 1,2-dicarboxylic acid anhydride, R is an organic moiety associated with the anhydride and A is equal to at least 2.

Subsequently, carboxyl groups formed by opening of the anhydride ring may react with hydroxyl groups to give off water via a condensation reaction. This latter reaction is not desired since it can lead to a polycondensation reaction resulting in products with higher molecular weights.

To achieve the desired reaction, the 1,2-acid anhydride and polyol are contacted together usually by mixing the two ingredients together in a reaction vessel. Preferably, reaction is conducted in the presence of an inert atmosphere such as nitrogen and in the presence of a solvent to dissolve the solid ingredients and/or to lower the viscosity of the reaction mixture. Examples of suitable solvents include, for example, ketones such as methyl amyl ketone, diisobutyl ketone, methyl isobutyl ketone; aromatic hydrocarbons such as toluene and xylene; as well as other organic solvents such as dimethyl formamide and N-methylpyrrolidone.

For the desired ring opening reaction and half-ester formation, a 1,2-acid anhydride is used. Reaction of a polyol with an acid instead of an anhydride would require esterification by condensation eliminating water which would have to be removed by distillation. Under these conditions this would promote undesired polyesterification. Also, the reaction temperature is preferably low, that is, no greater than 135° C., preferably less than 120° C., and usually within the range of 70°-135° C., preferably 90°-120° C. Temperatures greater than 135° C. are undesirable because they promote polyesterification, whereas temperatures less than 70° C. are undesirable because of sluggish reaction.

The time of reaction can vary somewhat depending principally upon the temperature of reaction. Usually the reaction time will be until a sufficiently constant acid value is obtained and will usually be from as low as 10 minutes to as high as 24 hours.

The equivalent ratio of anhydride to hydroxy of the polyol is preferably at least about 0.8:1 (the anhydride being considered monofunctional) so as to obtain maximum conversion to the desired half-ester. Ratios less than 0.8:1 can be used but such ratios result in increased formation of less preferred half-esters.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are simple polyols, that is, those containing from about 2 to 20 carbon atoms as well as polymeric polyols such as polyester polyols, polyurethane polyols and acrylic polyols.

Among the simple polyols preferred are diols, triols and mixtures thereof. Examples of the polyols are preferably those containing from 2 to 10 carbon atoms such as aliphatic polyols. Specific examples include ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, trimethylolpropane, 2,2,4-trimethylpentane-1,3-diol, pentaerythritol and 1,2,3,4-butanetetrol. Aromatic polyols such as bisphenol A and bis(hydroxymethyl) xylene can also be used.

With regard to polymeric polyols, the polyester polyols are prepared by esterification of an organic polycarboxylic acid or anhydride thereof with organic polyols and/or an epoxide. Usually, the polycarboxylic acids and polyols are aliphatic or aromatic dibasic acids or acid anhydrides and diols.

The diols which are usually employed in making the polyester include alkylene glycols such as ethylene glycol, neopentyl glycol and other glycols such as hydrogenated bisphenol A, cyclohexanediol, cyclohexanedimethanol, the reaction products of lactones and diols, for example, the reaction product of epsilon-caprolactone and ethylene glycol, hydroxy-alkylated bisphenols, polyester glycols, for example, poly(oxytetramethylene)glycol and the like. Polymeric polyols of higher functionality can be used but their use is not preferred because of resultant higher viscosities.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, methylhexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid. However, the use of these higher functionality polycarboxylic acids are not preferred because of resultant high viscosities.

Besides the polyester polyols formed from polybasic acids and polyols, polylactone-type polyesters can also be employed. These products are formed from the reaction of a lactone such as epsilon-caprolactone and a polyol such as ethylene glycol, diethylene glycol and trimethylolpropane.

Besides polyester polyols, polyurethane polyols such as polyester-urethane polyols which are formed from reacting an organic polyisocyanate with a polyester polyol such as those described above can be used. The organic polyisocyanate is reacted with a polyol so that the OH/NCO equivalent ratio is greater than 1:1 so that the resultant product contains free hydroxyl groups. The organic polyisocyanate which is used in preparing the polyurethane polyols can be an aliphatic or aromatic polyisocyanate or a mixture. Diisocyanates are preferred, although higher polyisocyanates such as triisocyanates can be used, but they do result in higher viscosities.

Examples of suitable diisocyanates are 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates are polymethylene polyphenyl isocyanates.

The half-ester is present in the crosslinkable composition in amounts of about 10 to 90, preferably 25 to 75 percent by weight based on total weight of resin solids.

The polyepoxide and the half-ester are essential ingredients in the crosslinkable composition. However, there are optional materials which can also be included in the composition. These include an acid functional acrylic polymer and a free anhydride.

The acid functional acrylic polymer provides for sag control. The preferred crosslinkable compositions are high solids compositions and have a tendency to sag when applied as a coating to vertical surfaces. The acid functional acrylic polymer surprisingly provides sag control to the compositions. The acid functional acrylic polymers are the reaction product of an ethylenically unsaturated polymerizable carboxylic acid such as acrylic acid or methacrylic acid and ethylenically unsaturated polymerizable monomers other than said acids. These products are nongelled and typically will have number average molecular weights as determined by gel permeation chromatography using a polystyrene standard of from about 500 to 5000, preferably 700 to 3000. The preferred reaction products will also have a uniform molecular weight distribution which is evidenced by polydispersity values which are preferably less than 4, more preferably from 2 to 3. The polydispersity value is the ratio of the weight average molecular weight to the number average molecular weight each being determined by gel permeation chromatography using a polystyrene standard as described above.

The amount of acid functional acrylic polymer which is used can vary from 0 to 50, preferably from 10 to 20 percent by weight based on total weight of resin solids.

The crosslinkable compositions also preferably contain an anhydride, preferably an anhydride which is a liquid at 25° C. The presence of such an anhydride in the compositions provides an improved cure response. Examples of suitable anhydrides include alkyl-substituted hexahydrophthalic anhydrides such as methylhexahydrophthalic anhydride and dodecenylsuccinic anhydride. The amount of the anhydride which is used can vary from 0 to 40, preferably from 5 to 25 percent by weight based on total weight of resin solids.

The equivalent ratio of acid to epoxy in the clear film-forming compositions is preferably adjusted so that there are about 0.3 to 3.0, preferably from 0.8 to 1.5 equivalents of acid (1 anhydride being considered monofunctional) per equivalent of epoxy.

The compositions will also preferably contain catalysts to accelerate the cure of the epoxy and acid groups. Examples of suitable catalysts include organic amines and quaternary ammonium compounds such as pyridine, piperidine, dimethylaniline, diethylenetriamine, tetramethyl ammonium chloride, tetramethyl ammonium acetate and tetramethyl benzyl ammonium acetate. The amount of catalyst is typically from 0 to 10, preferably 0.5 to 3 percent by weight based on weight of resin solids.

The crosslinkable compositions are preferably formulated into high solids coating compositions. That is, these coating compositions contain greater than 50 percent, most preferably greater than 60 percent by weight resin solids. The solids content is determined by heating the composition to 110° C. for 1 to 2 hours to drive off the volatile material. The compositions are preferably liquid high solids compositions but they can also be formulated as powder coatings.

Also, optional ingredients such as auxiliary curing agents such as aminoplast resins, plasticizers, anti-oxidants, and UV light absorbers can be included in the composition. These ingredients typically are present in amounts of up to 25 percent by weight based on total resin weight.

The coating composition can be applied to the substrate by any of the conventional coating techniques such as brushing, spraying, dipping or flowing, but it is preferred that spray applications be used since this gives the best appearance. Any of the known spray techniques may be employed such as compressed air spraying, electrostatic spraying and either manual or automatic methods.

After application of the coating composition to the substrate, the coated substrate is heated to cure the coating. In the curing operation, solvents are driven off and the film-forming material of the top coat and/or of the base coat is crosslinked with the aid of any crosslinking agents present. The heating or curing operation is usually carried out at a temperature in the range of from 160°–350° F. (71°–177° C.) but if needed lower or higher temperatures may be used depending upon whether it is sufficient to activate any necessary crosslinking mechanisms. The thickness of the coating is usually from about 1 to 5, preferably 1.2 to 3 mils.

Preferably, the compositions of the present invention, particularly those prepared with the aliphatic polyepoxide, and more preferably with the epoxy-containing acrylic polymers, are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent top coat over the base coat.

The film-forming composition of the base coat can be any of the compositions useful in coating applications, particularly automotive applications in which the color-plus-clear coating applications are finding their most use. A film-forming composition conventionally comprises a resinous binder and a pigment to act as a colorant. Particularly useful resinous binders are acrylic polymers, polyesters including alkyds and polyurethanes. The resinous binder for the base coat can be an organic solvent-based material such as those described in U.S. Pat. No. 4,220,679, note column 2, line 24, continuing through column 4, line 40. Also, water-based coating compositions such as those described in U.S. Pat. No. 4,403,003 and U.S. Pat. No. 4,147,679 can also be used as the binder in the base coat composition. The resinous binder for the base coat can also be the polyepoxide-polyacid composition of the present invention.

The base coat composition also contains pigments including metallic pigmentation to give it color. Examples of suitable pigmentations for the base coat are described in the aforementioned U.S. Pat. Nos. 4,220,679; 4,403,003 and 4,147,679.

Optional ingredients in the base coat composition are those which are well known in the art of formulating surface coatings and include sufactants, flow control agents, thixotropic agents, fillers, anti-gassing agents, organic co-solvents, catalysts and other customary auxiliaries. Examples of these materials and suitable amounts are described in the aforementioned U.S. Pat. Nos. 4,220,679; 4,403,003 and 4,147,679, but they are most often applied by spraying. The usual spray techniques and equipment for air spraying and electrostatic spraying in either manual or automatic methods can be used.

During application of the base coat to the substrate, a film of the base coat is formed on the substrate typically in a thickness of about 0.1 to 5 and preferably about 0.1 to 2 mils.

After forming a film of the base coat on the substrate, solvent, that is, organic solvent and/or water, is driven out of the base coat film by heating or simply an air drying period before application of the clear coat. Preferably, the heating step will only be that sufficient and for a short period of time to insure that the clear top coat composition can be applied to the base coat without the former dissolving the base coat composition, that is, "striking in". Suitable drying conditions will depend on the particular base coat composition, on the ambient humidity with certain water-based compositions, but in general a drying time of from about 1 to 5 minutes at a temperature of about 80°–175° F. (20°–79° C.) will be adequate to insure that mixing of the two coats is minimized. At the same time, the base coat film is adequately wetted by the clear top coat composition so that satisfactory intercoat adhesion can be obtained. Also, more than one base coat and more than one top coat may be applied to develop optimum appearance. Usually between coats, the previously applied base coat or top coat is flashed, that is, exposed to ambient conditions for about 1 to 20 minutes.

The clear top coat composition is applied to the base coat by any of the conventional coating techniques mentioned above, although spray applications are preferred. As mentioned above, the clear top coat is applied to the base coat via a wet-on-wet technique before the base coat has been cured. The two coatings are then heated to conjointly harden both coating layers. Curing conditions such as described above can be used.

The invention will be further defined by reference to the following examples. Unless otherwise indicated, all parts are by weight.

EXAMPLES

The following examples (Examples A–J) show the preparation of various polyacid half-esters, an epoxy-containing acrylic polymer and an acid-containing acrylic polymer.

EXAMPLE A

A polyacid half-ester of neopentyl glycol and hexahydrophthalic anhydride was prepared from the following mixture of ingredients:

| Ingredients | Parts by Weight (in grams) |
| --- | --- |
| Neopentyl glycol | 1560.0 |
| Hexahydrophthalic anhydride | 4620.0 |
| Methyl amyl ketone | 2648.5 |

The ingredients were charged to a reaction vessel and heated under a nitrogen atmosphere to 100° C. The reaction temperature was kept below 120° C. until an acid value of about 190 was obtained. The resultant reaction product had a solids content of 68.1 percent (measured at 110° C.) and a final acid value of 192.5.

EXAMPLE B

A polyacid half-ester of 1,6-hexanediol-methylhexahydrophthalic anhydride was prepared from the following mixture of ingredients:

| Ingredients | Parts by Weight (in grams) |
|---|---|
| 1,6-Hexanediol | 590.0 |
| Methylhexahydrophthalic anhydride | 1680.0 |
| Methyl isobutyl ketone | 972.9 |

The 1,6-hexanediol and the methyl isobutyl ketone were charged to a reaction vessel and heated under a nitrogen atmosphere to 115° C. The methylhexahydrophthalic anhydride was charged over a 2-hour period while maintaining the reaction temperature between 112°-117° C. The reaction mixture was held at this temperature for about 3 to 4 hours to a stalled acid value, i.e., acid value remained essentially constant. The reaction mixture was then cooled to room temperature and found to have a solids content measured at 110° C. of 68.0 percent and an acid value of 176.

EXAMPLE C

A polyacid half-ester of a polyurethane polyol-methylhexahydrophthalic anhydride was prepared from the following mixture of ingredients.

The polyurethane polyol described below (80 percent resin solids) was reacted with methylhexahydrophthalic anhydride in the following charge ratio:

| Ingredient | Parts by Weight (in grams) |
|---|---|
| Polyurethane polyol[1] | 347.6 |
| Methyl isobutyl ketone | 45.6 |
| Methylhexahydrophthalic anhydride | 67.2 |

[1]The polyurethane polyol was a poly(esterurethane) diol prepared as generally described in Example 1 of U.S. Pat. No. 4,485,228. The poly(esterurethane) polyol had a solids content of about 80 percent in methyl isobutyl ketone, an acid value of 5.52 and a hydroxyl value of 80.73 based on resin solids.

The ingredients were charged to a reaction vessel and heated under a nitrogen atmosphere to 100° C. The reaction temperature was kept at about 105°-110° C. for about 4 hours until an acid value of about 61 was obtained. The reaction product had a solids content measured at 110° C. of 75.9 and an acid value of 56.3.

EXAMPLE D

A polyacid half-ester of a polycaprolactone triol and chlorendic anhydride was prepared from the following mixture of ingredients:

| Ingredients | Parts by Weight (in grams) |
|---|---|
| PCP-0301[1] | 300.0 |
| Chlorendic anhydride | 1112.4 |
| Methyl amyl ketone | 605.3 |

[1]Polycaprolactone triol available from Union Carbide Corporation.

The ingredients were charged to a reaction vessel and heated under a nitrogen atmosphere to 100° C. The reaction temperature was maintained at about 110° C. for 4 hours until an acid value of about 91 was obtained. The reaction product had a solids content measured at 110° C. of 70.3 and a final acid value of 95.8.

EXAMPLE E

A polyacid half-ester was formed from reacting a polycaprolactone diol with methylhexahydrophthalic anhydride in the following charge ratio:

| Ingredients | Parts by Weight (in grams) |
|---|---|
| PCP-0210[1] | 825.0 |
| Methylhexahydrophthalic anhydride | 336.0 |
| Methyl amyl ketone | 497.6 |

[1]Polycaprolactone diol available from Union Carbide Corporation.

The ingredients were charged to a reaction vessel and heated under a nitrogen atmosphere to 100° C. The reaction temperature was maintained at about 110° C. for 4 hours until an acid value of about 69 was obtained. The reaction product had a solids content measured at 110° C. of 68.3 and a final acid value of 72.5.

EXAMPLE F

A polyacid half-ester of trimethylolpropane and methylhexahydrophthalic anhydride was prepared from the following mixture of ingredients:

| Ingredients | Parts by Weight (in grams) |
|---|---|
| Trimethylolpropane | 1341.0 |
| Methylhexahydrophthalic anhydride | 5040.0 |
| Methyl isobutyl ketone | 2734.7 |

The trimethylolpropane and the methyl isobutyl ketone were charged to a suitable reaction vessel and heated under a nitrogen atmosphere to 115° C. The methylhexahydrophthalic anhydride was charged over a 2-hour period while maintaining the temperature between 112°-117° C. The reaction mixture was held at this temperature for about 3 hours. The reaction product was then cooled to room temperature and found to have a solids content measured at 110° C. of 69 percent and an acid value of 200.3.

EXAMPLE G

A polyacid half-ester of 1,6-hexanediol and o-sulfobenzoic anhydride was prepared from the following mixture of ingredients:

| Ingredients | Parts by Weight (in grams) |
|---|---|
| o-sulfobenzoic anhydride | 55.2 |
| 1,6-hexanediol | 17.7 |
| Methyl isobutyl ketone | 100.0 |

The 1,6-hexanediol and 70 grams of the methyl isobutyl ketone were charged to a reaction vessel and heated under a nitrogen atmosphere to reflux. Reflux was continued for about 30 minutes to remove water through a Dean-Stark trap. The temperature was lowered to 30° C. followed by the addition of the o-sulfobenzoic anhydride and the remaining portion of the methyl isobutyl ketone as a rinse. The reaction mixture was maintained at 40° C. until IR analysis could not detect the presence of anhydride. The reaction product had a solids content measured at 110° C. of 49.9 and an acid value of 104.

EXAMPLE H

An epoxy-containing acrylic polymer was prepared from the following mixture of ingredients:

| Ingredients | Weight in Grams | Percentage by Weight | |
|---|---|---|---|
| Glycidyl methacrylate | 320.0 | 40 | |
| Methyl methacrylate | 160.0 | 20 | |
| Butyl acrylate | 160.0 | 20 | |
| Butyl methacrylate | 160.0 | 20 | |
| VAZO-67[1] | 24.0 | 3.0 | (on monomers) |
| Tertiary-butyl perbenzoate | 16.0 | 2.0 | (on monomers) |
| Tertiary-butyl perbenzoate (post-addition) | 4.0 | 0.5 | (on monomers) |
| Tertiary-butyl perbenzoate (post-addition) | 4.0 | 0.5 | (on monomers) |

[1]Alpha, alpha'-dimethylazobis(isobutyronitrile) available from E. I. duPont de Nemours and Company.

Xylene (415.3 grams) was charged to a suitable reactor and heated to reflux to remove water through a Dean-Stark trap. The glycidyl methacrylate, methyl methacrylate, butyl acrylate and butyl methacrylate were mixed together. The VAZO-67, first portion of tertiary-butyl perbenzoate and 100 grams of xylene were also premixed together. The premixture of vinyl monomers and the premixture of initiators were added simultaneously to the reaction vessel over a period of about 3 hours while maintaining the reaction temperature at reflux. At the completion of the addition, the reaction mixture was held at reflux for one hour followed by the addition of the second portion of tertiary-butyl perbenzoate and 25 grams of xylene. The reaction mixture was held for one hour at reflux followed by the addition of the third portion of tertiary-butyl perbenzoate and 25 grams of xylene. The reaction mixture was held for two hours at reflux followed by cooling to room temperature. The reaction mixture had a solids content of about 60 percent and a number average molecular weight of 1456 as determined by gel permeation chromatography using a polystyrene standard.

EXAMPLE J

An epoxy-containing acrylic polymer was prepared from the following mixture of ingredients:

| Kettle Charge | |
|---|---|
| Ingredients | Parts by Weight |
| Butyl acetate | 906.0 |

| Charge I | | |
|---|---|---|
| Ingredients | Parts by Weight (in grams) | Percentage By Weight |
| Glycidyl methacrylate | 510.0 | 30 |
| Methyl methacrylate | 595.0 | 35 |
| Butyl acrylate | 170.0 | 10 |
| Butyl methacrylate | 425.0 | 25 |
| Butyl acetate | 200 | |

| Charge II | |
|---|---|
| Ingredients | Parts by Weight (in grams) |
| VAZO 67 | 59.5 |
| Butyl acetate | 180.0 |

| Charge III | |
|---|---|
| Ingredients | Parts by Weight (in grams) |
| VAZO 67 | 8.5 |
| Butyl acetate | 40.0 |

The kettle charge was heated in a suitable reactor to reflux to remove water through a Dean-Stark trap. Charges I and II were added simultaneously over the period of about three hours while maintaining the reaction mixture at reflux. At the conclusion of the addition of Charges I and II, the reaction mixture was held for one hour at reflux followed by the addition of Charge III over a 30-minute period. The reaction mixture was held at reflux for an additional hour followed by cooling to room temperature. The volatile materials in the reaction mixture were then removed by heating under vacuum to a solids content of 99.8 percent. The reaction product had a number average molecular weight of 4048.

EXAMPLE K

An acid functional acrylic polymer was prepared from the following ingredients:

| Kettle Charge | |
|---|---|
| Ingredients | Parts by Weight (in grams) |
| Half-ester prepared as described in Example B | 2571.3 |

| Feed A | | |
|---|---|---|
| Ingredients | Parts by Weight (in grams) | Percent |
| 2-Ethylhexyl acrylate | 2160 | 40 |
| Styrene | 1080 | 20 |
| Methacrylic acid | 1080 | 20 |
| Butyl methacrylate | 1053 | 19.5 |
| Methyl methacrylate | 27 | 0.5 |
| Di-tertiary-butyl peroxide | 54 | 1% based on monomers |

| Feed B | |
|---|---|
| Ingredients | Parts by Weight (in grams) |
| Methyl isobutyl ketone | 1800 |

The kettle charge was heated under a nitrogen atmosphere to reflux. Solvent was distilled and the reaction temperature increased to about 240° C. Feed A was added over a period of 30 minutes while maintaining the temperature between 187° and 200° C. At the completion of Feed A, the reaction mixture was held for 10 minutes at 189° C. Solvent was distilled until the reaction temperature reached 220° C. The reaction mixture was then cooled to 120° C. followed by thinning with Feed B. The reaction mixture was then cooled and found to have a solids content of 76.6 percent measured at 110° C., an acid value of 103.5 (theoretical 126) and a number average molecular weight of 840 as determined by gel permeation chromatography using a polystyrene standard.

The following examples (1–10) show the preparation of coating compositions employing the various polyacid half-esters described above and various polyepoxides.

EXAMPLE 1

A coating composition was prepared by mixing together the half-ester of Example A (hexahydrophthalic anhydride-neopentyl glycol) with the aliphatic polyepoxide 3,4-epoxycyclohexylmethyl 3,4-epoxycyclohexanecarboxylate.

| Ingredients | Parts by Weight (in grams) | Equivalents |
|---|---|---|
| Half-ester of Example A | 29.1 | 0.1 |
| 3,4-Epoxycyclohexylmethyl 3,4-epoxycyclohexanecarboxylate[1] | 13.9 | 0.1 |

| Ingredients | Parts by Weight (in grams) | Equivalents |
|---|---|---|
| N,N—dimethylethanolamine | 0.34 | (1% on resin solids) |

[1]Available from Shell Chemical Company as ERL-4221.

The above materials were mixed together to form a coating composition having a resin solids content of about 80 percent. The mixture was drawn down on a glass panel with a 3-mil drawbar, allowed to stand for 5 minutes and then baked for 30 minutes at 275° F. (135° C.). The baked film was clear with no yellowing and was unaffected by 20 xylene double rubs. A double rub is a rub back and forth across the same area with a xylene-saturated cloth using normal hand pressure. The cured coating had a 2H pencil hardness.

EXAMPLE 2

A coating composition was formulated from the half-ester of Example B (1,6-hexanediol-methylhexahydrophthalic anhydride) and the aliphatic polyepoxide of Example 1.

| Ingredients | Parts by Weight (in grams) | Equivalents |
|---|---|---|
| Half-ester of Example B | 30.0 | 0.1 |
| ERL-4221 | 13.9 | 0.1 |
| N,N—dimethylethanolamine | 0.35 | |

The above materials were mixed together and drawn down on a glass panel with a 3-mil drawbar, allowed to flash for 5 minutes and then baked for 30 minutes at 275° F. (135° C.). The baked films were clear and had a pencil hardness of 2H–3H and were unaffected by 10 xylene double rubs.

EXAMPLE 3

A coating composition was formulated with the half-ester of Example C (polyurethane polyol-methylhexahydrophthalic anhydride) and the epoxy-containing acrylic polymer of Example H.

| Ingredients | Parts by Weight (in grams) | Equivalents |
|---|---|---|
| Half-ester of Example C | 9.96 | 0.01 |
| Epoxy-containing acrylic polymer of Example H | 6.54 | 0.01 |
| N,N—dimethylethanolamine | 0.11 | |

The above materials were mixed together and drawn down on a glass panel with a 3-mil drawbar and baked for 30 minutes at 275° F. (135° C.). The resultant coating was clear, tack-free and had excellent flexibility.

EXAMPLE 4

A coating composition was formulated with the half-ester of Example D (PCP-0301-chlorendic anhydride) and the epoxy-containing acrylic polymer of Example H.

| Ingredients | Parts by Weight (in grams) | Equivalents |
|---|---|---|
| Half-ester of Example D | 6.20 | 0.01 |
| Epoxy-containing acrylic polymer | 6.54 | 0.01 |
| N,N—dimethylethanolamine | 0.08 | |

The above ingredients were mixed together and drawn down on a glass panel with a 3-mil drawbar. The coating was allowed to flash for 5 minutes and then baked for 30 minutes at 275° F. (135° C.). The cured film had a clear appearance with no surface defects and a 2H pencil hardness.

EXAMPLE 5

A coating composition was formulated with the half-ester of Example E (PCP-0210-methylhexahydrophthalic anhydride) and the epoxy-containing acrylic polymer of Example H.

| Ingredients | Parts by Weight (in grams) | Equivalents |
|---|---|---|
| Half-ester of Example E | 15.48 | 0.02 |
| Epoxy-containing acrylic polymer | 13.08 | 0.02 |
| N,N—dimethylethanolamine | 0.18 | |

The above materials were mixed together and drawn down on a glass panel with a 3-mil drawbar. The coating was cured to a rubbery, non-tacky material having excellent clarity.

EXAMPLE 6

A coating composition was prepared by mixing together the half-ester of Example G (o-sulfobenzoic anhydride-1,6-hexanediol) with the epoxy-containing acrylic polymer of Example H.

| Ingredients | Parts by Weight (in grams) | Equivalents |
|---|---|---|
| Half-ester of Example G | 0.48 | 0.00089 |
| Epoxy-containing acrylic polymer | 13.08 | 0.02 |
| Monomethylether of propylene glycol | 1.00 | |

The above ingredients were mixed, stirred and drawn down on a glass panel with a 3-mil drawbar. The resulting film was baked for 30 minutes at 275° F. (135° C.). The baked film cured to a tack-free coating having no haziness.

EXAMPLE 7

A pigmented base coat composition containing aluminum flake pigmentation, the epoxy-containing acrylic polymer of Example H and the 1,6-hexanediol-methylhexahydrophthalic anhydride half-ester of Example B was prepared from the following mixture of ingredients:

| Ingredients | Parts by Weight (in grams) | Resin Solids | Pigment Solids |
|---|---|---|---|
| TINUVIN 328 | 3.0 | 3.0 | |
| Hexyl acetate | 60.9 | — | |
| Flow control agent[1] | 45.4 | 20.0 | |
| Epoxy-containing acrylic polymer of Example H | 81.4 | 47.2 | |
| 1,6-Hexanediol-methyl- | 47.5 | 32.8 | |

| Ingredients | Parts by Weight (in grams) | Resin Solids | Pigment Solids |
|---|---|---|---|
| hexahydrophthalic anhydride half-ester of Example B | | | |
| ARMEEN DM 12D | 2.0 | 2.0 | |
| Aluminum flake[2] | 15.4 | — | 10.0 |

[1] Polymeric microparticle prepared in accordance with Example 11 of U.S. Pat. No. 4,147,688.
[2] 65 Percent by weight non-leafing aluminum flakes and hydrocarbon solvent available from Alcoa Company as L-7575.

The ingredients were mixed in the order indicated at low shear with good agitation to form the pigmented base coating composition.

The following examples (Examples 8, 9, 10 and 11) show the formulation of coating compositions for clear coats in color-plus-clear applications.

EXAMPLE 8

A clear film-forming composition was prepared with the epoxy-containing acrylic polymer of Example H and the 1,6-hexanediol-methyl-hexahydrophthalic anhydride half-ester of Example B. The composition was made by mixing together the following ingredients:

| Ingredients | Parts by Weight (in grams) | Percent Resin Solids |
|---|---|---|
| TINUVIN 328[1] | 3.0 | 3.0 |
| Hexyl acetate[2] | 20.0 | — |
| Epoxy-containing acrylic polymer of Example H | 103.8 | 60.2 |
| 1,6-Hexanediol-methyl-hexahydrophthalic anhydride half-ester of Example B | 57.5 | 39.8 |
| DC-200 10 C.S.[3] (10% in xylene) | 1.0 | 0.1 |
| ARMEEN DM 12D[4] | 2.0 | 2.0 |

[1] Substituted benzotriazole UV light stabilizer available from Ciba-Geigy Corporation.
[2] EXXATE 600 from Exxon Co.
[3] Silicone fluid available from the Dow Corning Corporation.
[4] N,N—dimethyldodecylamine available from AKZO Chemical.

The formulated coating composition contained 56 percent by weight resin solids and had a No. 4 Ford cup viscosity of 26.3 seconds.

EXAMPLE 9

A clear film-forming composition was prepared with the epoxy-containing acrylic polymer of Example H and the trimethylolpropane-methylhexahydrophthalic anhydride half-ester of Example F. The composition also contained methylhexahydrophthalic anhydride and the diglycidyl ether of cyclohexanedimethanol to accelerate cure and to optimize coating properties. The formulation was made by mixing the following ingredients:

| Ingredients | Parts by Weight (in grams) | Percent Resin Solids |
|---|---|---|
| TINUVIN 328 | 3.0 | 3.0 |
| Methyl ethyl ketone | 14.8 | — |
| DC-200 | 1.0 | 0.1 |
| Diglycidyl ether of cyclohexanedimethanol | 16.8 | 16.8 |
| Methylhexahydrophthalic anhydride | 16.5 | 16.5 |
| ARMEEN DM 12D | 2.0 | 2.0 |
| Epoxy-containing acrylic polymer of Example H | 72.3 | 41.6 |
| Trimethylolpropane-methyl-hexahydrophthalic anhydride half-ester of Example F | 35.3 | 25.1 |

The resultant formulated coating composition contained 65 percent resin solids and had a No. 4 Ford cup viscosity of 18.1 seconds.

EXAMPLE 10

A clear film-forming composition similar to that of Example 9 but including the acid functional acrylic polymer of Example K was prepared from the following mixture of ingredients:

| Ingredients | Parts by Weight (in grams) | Percent Resin Solids |
|---|---|---|
| TINUVIN 328 | 3.0 | 3.0 |
| Methyl ethyl ketone | 17.7 | — |
| DC-200 | 1.0 | 0.1 |
| Diglycidyl ether of cyclohexanedimethanol | 16.8 | 16.8 |
| Methylhexahydrophthalic anhydride | 16.5 | 16.5 |
| ARMEEN DM 12D | 2.0 | 2.0 |
| Epoxy-containing acrylic polymer of Example H | 64.5 | 37.4 |
| Trimethylolpropane-methyl-hexahydrophthalic anhydride half-ester of Example F | 21.6 | 14.7 |
| Acid-containing acrylic polymer of Example K | 18.6 | 14.5 |

The formulated coating composition contained 65 percent by weight resin solids and had a No. 4 Ford cup viscosity of 24.2 seconds.

The clear film-forming compositions of Examples 8, 9 and 10 were applied to a light blue metallic water-base base coat to form a color-plus-clear coating over steel substrates. The light blue metallic base coat was available from Imperial Chemical Industries, Ltd. as M-979. This product was prepared in accordance with the teachings of U.S. Pat. No. 4,403,003.

The base coat was spray applied by hand to a steel panel at a temperature of 25° C. A 3-minute flash at 180° F. (82° C.) was allowed between coats. The total film thickness for the base coat was 0.3 mil.

After application of the second base coat, two coats of the various clear coat compositions of Examples 8, 9 and 10 were spray applied with an automatic spraying device. The two coats were applied wet-on-wet to the base-coated panels with a 2-minute flash off at room temperature between the coats. After a final 2-minute flash off, the panels were baked in both the horizontal and the vertical positions (90° from horizontal) at 250° F. (121° C.) for 30 minutes. The properties of the coatings which are reported in the table below show high gloss and DOI and excellent adhesion.

TABLE

| | Properties of Color + Clear Coatings | | |
|---|---|---|---|
| | Clear Coat | | |
| | Ex. 8 | Ex. 9 | Ex. 10 |
| | Clear Coat Film Thickness in mils | | |
| | 1.7 | 1.8 | 1.5 |
| 20° Gloss[1] Horizontal/Vertical | 88/87 | 88/87 | 89/88 |
| DOI[2] Horizontal/Vertical | 85/80 | 100/85 | 95/90 |
| Adhesion[3] | 5 | 5 | 5 |

TABLE-continued

Properties of Color + Clear Coatings

| | Clear Coat | | |
|---|---|---|---|
| | Ex. 8 | Ex. 9 | Ex. 10 |
| | Clear Coat Film Thickness in mils | | |
| | 1.7 | 1.8 | 1.5 |
| Tukon Hardness Number[4] | 2.15 | 8.24 | 5.75 |
| Sag Resistance[5] | good | poor | good |

[1]Measured with a 20 degree gloss meter manufactured by Gardner Instrument Company. Measurements were made on the panels which were baked in both the vertical and horizontal positions.
[2]Determined on Dori-Gon Meter D47-6 manufactured by Hunter Laboratories.
[3]Crosshatch adhesion determined by ASTM D-3359.
[4]Determined by ASTM E-384.
[5]Sag resistance was determined on the panels which were baked in the vertical position. An excellent rating indicated essentially no sagging or dripping of the coating. Sag is indicated by a considerably thicker film developing on the bottom of the panel. A good rating indicated some sagging. A poor rating indicated heavy sagging or dripping.

EXAMPLE 11

A clear film-forming powder coating composition was prepared by mixing together the following ingredients:

| Ingredients | Parts by Weight (in grams) |
|---|---|
| TINUVIN 900[1] | 3.0 |
| IRGANOX 1010[2] | 1.0 |
| Benzoin | 0.5 |
| FC-430[3] | 1.0 |
| Trimethylolpropane-methyl-hexahydrophthalic anhydride half-ester of Example F[4] | 30.8 |
| Epoxy-containing acrylic polymer of Example J | 69.2 |

[1]Hindered UV light stabilizer available from Ciba Geigy Corp.
[2]Hindered phenol anti-oxidant available from Ciba Geigy Corp.
[3]Fluorocarbon surfactant available from the 3M Corp.
[4]Solvent stripped to 99.8 percent solids.

The ingredients mentioned above were blended together in a planetary mixer, extruded, chilled on a chill roll, flaked and ground into a fine powder in a micromill and then passed through a 100-mesh screen to form the final powder coating composition.

The powder coating composition was applied to the base coat of Example 7. The base coat was spray applied by hand to steel panels at a temperature of 25° C. Two coats were applied with a 90-second flash at ambient conditions between coats. The total film thickness was 0.6 mil. After application of the second base coat, two coats of the clear powder coating composition were electrostatically sprayed onto the base coat via a wet-on-wet application. The composite coating was then baked at 350° F. (177° C.) for 30 minutes. The clear coat had a thickness of 2.6 mils, a 20° gloss of 80, a DOI of 45 and a crosshatch adhesion value of 5, a Tukon hardness number of 10.0 and good solvent resistance.

We claim:

1. A liquid crosslinkable composition which comprises an epoxy-containing acrylic polymer which is a copolymer of an ethylenically unsaturated monomer having at least one epoxy group selected from the class consisting of glycidyl acrylate, glycidyl methacrylate and allyl glycidyl ether and at least one polymerizable ethylenically unsaturated monomer which is free of epoxy groups and a polyacid curing agent of the structure:

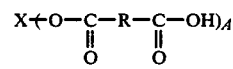

where X is the residue of a polyol after reaction with a 1,2-dicarboxylic acid anhydride, containing from 2 to 30 carbon atoms exclusive of carbon atoms in the anhydride moiety, R is an organic moiety associated with the anhydride, and A is equal to at least 2.

2. The composition of claim 1 in which the epoxy-containing acrylic polymer has a number average molecular weight of from about 500 to 20,000.

3. The composition of claim 1 in which the epoxy-containing acrylic polymer is a copolymer of glycidyl acrylate or methacrylate with at least one other polymerizable ethylenically unsaturated monomer.

4. The composition of claim 1 in which epoxy-containing acrylic polymer is present in amounts of 10 to 90 percent by weight based on total weight of resin solids.

5. The composition of claim 1 in which the polyol is a diol, triol or mixture thereof.

6. The composition of claim 5 in which the diol is selected from the class consisting of neopentyl glycol, 1,6-hexanediol and trimethylolpropane.

7. The composition of claim 1 in which the polyol is a polymeric polyol.

8. The composition of claim 7 in which the polymeric polyol is selected from the class consisting of a polyester polyol, polyurethane polyol, polyether polyol, polyacrylic polyol and mixtures thereof.

9. The composition of claim 1 in which the acid anhydride is selected from the class consisting of hexahydrophthalic anhydride and alkyl-substituted hexahydrophthalic anhydrides.

10. The composition of claim 1 in which the half-ester is present in amounts of 10 to 90 percent by weight based on total weight of resin solids.

11. The composition of claim 1 in which there are from 0.3 to 3.0 equivalents of acid for each equivalent of epoxide.

* * * * *